June 11, 1929. E. A. LARSEN 1,716,782
ROTATIVE DROP BOW PEN INSTRUMENT CENTRIFUGALLY GOVERNED Filed Sept. 20, 1928

Edward A. Larsen INVENTOR.

Patented June 11, 1929.

1,716,782

UNITED STATES PATENT OFFICE.

EDWARD ALFRED LARSEN, OF LARKSPUR, CALIFORNIA.

ROTATIVE DROP BOW-PEN INSTRUMENT CENTRIFUGALLY GOVERNED.

Application filed September 20, 1928. Serial No. 307,237.

My invention relates to improvements in rotative drop bow pens or pencils for making circles on paper.

The object of my invention is to provide a bow pen of this type, which, when the point of its center spindle is stuck into the paper, will be suspended in normal position with the points of the pen slightly above and off the paper, and which, when the pen is made to spin around the spindle, will move down so that the pen points will contact the paper and describe a circle, and then, when rotation ceases, the pen will return to normal with the points off the paper.

The well known rotative drop bow pen now in use consists of two elementary parts, a center spindle held stationary with its point stuck in the paper, and a pen part rotatively mounted on the spindle and which, by a flip of the finger is made to spin around same, thereby making a circle on the paper. My invention consists of incorporating into the above described instrument a third element which consists of a ball pendulum or governor, vertically suspended to the instrument in such manner as to swing centrifugally away from its normal position in the instrument when same is rotated and to return to normal position when rotation ceases.

The ball pendulum is so connected to the rotative pen part and stationary spindle part that as the ball pendulum swings out and in during its rotation, a relative leverage vertical movement between the spindle and pen part is effected which movement brings the pen part into and out of contact with the paper, with the result that a circle is marked on the paper when the pen is in contact therewith and that is when the pendulum is rotating at or near its outer position.

One form of my invention is illustrated in the accompanying drawing in which:

Fig. 3 is a plan view of the top lever arm, of the pendulum member showing its relation to the spindle and the pen part.

Referring to the drawing in which similar numerals refer to similar parts throughout the several views:

Figure 1:
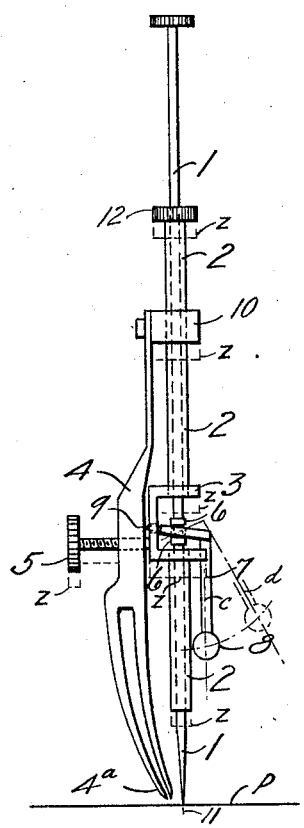
Fig. 1 is a side view.
Figure 2:
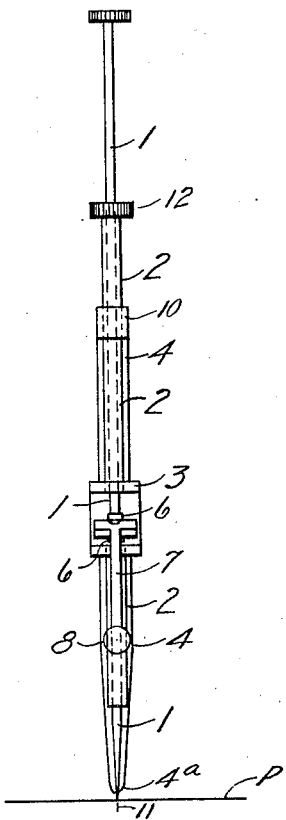
Fig. 2 is a front view.

Numeral 1 shows a center spindle or handle adapted to be held by the fingers with its point 11 stuck into the paper P where the circle is to be made.

A second part consists of a pen, comprising parts 2, 3, 4, 5, 10, 4ª and 12, which is rotatably mounted on the spindle 1 and which is shown in normal position. A third part consisting of a centrifugal governor or ball pendulum 7 and 8 is connected to both the spindle 1 and pen 2, 3, 4, 5, 10, 4ª and 12, in such manner as to rotate in cycles with the pen part, but free to be actuated by centrifugal force and assume positions angular to the spindle as it rotates.

The cycle of operations of the pen is as follows: As the instrument is applied to the paper P in the making of a circle, the point 11 of the spindle 1 is in the paper P, while the pen parts 2, 3, 4, 5, 10, 4ª and 12 are in normal or raised position.

As the spindle 1 is held stationary in the fingers a rotative spin is given the pen, comprising parts 2, 3, 4, 5, 10, 4ª and 12, by the finger disc 12, causing the ball pendulum 7—8 to rotate therewith and to swing outward from normal position denoted as axis C to angular position denoted as axis $d$ as the pendulum rotates with the pen and allows the pen 2, 3, 4, 5, 10, 4ª and 12 to move down to position shown by dotted lines Z which movement brings the inked points 4ª of the pen into contact with the paper P and makes a circle thereon. As rotation of the pen and pendulum ceases, the pendulum 7—8 drops back to vertical or normal position C thereby causing a leverage lifting action on the part 3 by points 9 of the upper lever arm of 7—8, which are in a pivot like engagement with 3. In this leverage action of the upper lever arm of pendulum 7—8 the fulcrum point is the lower collar 6 rigidly fixed on spindle 1, and it is this leverage lifting action which returns the pen 2, 3, 4, 5, 10, 4ª and 12 to normal position by raising same up and off the paper P while leaving the spindle 1 in contact with the paper. The collars 6 being annular members permit the free rotation of lever arm of 7—8 around same. The lever 7—8 is connected to the instrument by means of the spindle 1 which passes freely through an opening in the upper lever arm of 7—8.

I do not wish to limit myself to the exact construction shown, as many variations may be made within the scope of the claims without departing from the spirit of my invention.

What I claim is:

1. A rotative instrument of the type described consisting of a center spindle carrying a center point, marking means rotatably mounted thereon and centrifugal means connecting the said spindle and marking means so as to cause the marking means to move vertically on the spindle as it rotates around the spindle.

2. A rotative drop bow instrument consisting of a center point spindle and handle, a bow pen mounted thereon to rotate horizontally and reciprocate vertically and a lever and pendulum centrifugal governor connected to the said spindle and bow pen whereby the vertical reciprocation of the bow pen is governed by the centrifugal throw of the governor actuated in turn by the rotary motion of the bow pen.

3. In an instrument as described the combination of a spindle, a pen rotatable and slidable thereon, and centrifugal means connecting the said spindle and pen in such manner as to cause the rotating pen to reciprocate vertically as said pen is rotated.

4. The combination including a rotative drop bow pen consisting of a center spindle having a pointed lower end and a handle top end, a bow pen rotatably and slidably mounted thereon having a screw adjustment means for moving the pen points toward and away from the spindle point and a pendulum like centrifugal governor connecting the said spindle and bow pen in a manner to move the rotating pen downward when the governor is swinging centrifugally outward and to move the rotating pen upward when the governor is swinging inward.

EDWARD ALFRED LARSEN.